(12) United States Patent
Angellotti

(10) Patent No.: US 6,555,043 B2
(45) Date of Patent: Apr. 29, 2003

(54) METHOD OF MAKING A CARRIAGE ASSEMBLY FOR A DISK DRIVE

(75) Inventor: Thomas J. Angellotti, Ogden, UT (US)

(73) Assignee: Iomega Corporation, Roy, UT (US)

( * ) Notice: Subject to any disclaimer, the term of this patent is extended or adjusted under 35 U.S.C. 154(b) by 72 days.

(21) Appl. No.: 09/919,258

(22) Filed: Jul. 31, 2001

(65) Prior Publication Data

US 2001/0042941 A1 Nov. 22, 2001

Related U.S. Application Data

(60) Continuation of application No. 09/684,503, filed on Oct. 6, 2000, now abandoned, which is a division of application No. 08/872,712, filed on May 30, 1997, now Pat. No. 6,147,842.

(51) Int. Cl.$^7$ .................... B29C 45/14; B29C 70/70; G11B 5/55; G11B 5/84
(52) U.S. Cl. ............. 264/263; 264/272.15; 264/272.19; 264/277; 360/266.5
(58) Field of Search .............................. 264/263, 271.1, 264/272.11, 272.15, 272.19, 275, 277, 279.1; 360/265.7, 265.8, 266.1, 266.2, 266.3, 266.4, 266.5, 266.6, 266.7, 266.8, 266.9, 106, 105, 104

(56) References Cited

U.S. PATENT DOCUMENTS

| 4,504,879 A | 3/1985 | Toldi et al. ................. 360/105 |
| 4,571,649 A | 2/1986 | Goss ......................... 360/106 |
| 4,663,677 A | 5/1987 | Griffith et al. ................ 360/71 |
| 4,663,682 A | 5/1987 | McNeil ...................... 360/105 |
| 4,683,506 A | 7/1987 | Toldi et al. ................. 360/105 |
| 4,722,012 A | 1/1988 | Toldi et al. ................... 360/97 |
| 4,740,851 A | 4/1988 | Jones et al. ................... 360/97 |
| 4,787,000 A | 11/1988 | Schulze ..................... 360/105 |
| 4,811,143 A | 3/1989 | Ohashi et al. ............... 360/105 |
| 4,901,173 A | 2/1990 | Jones et al. ............... 360/99.04 |
| 4,965,685 A | 10/1990 | Thompson et al. ...... 360/97.01 |
| 5,027,241 A | 6/1991 | Hatch et al. ................. 360/105 |
| 5,029,029 A | 7/1991 | Hatchett et al. ............. 360/106 |
| 5,130,871 A | 7/1992 | Whitmore .................... 360/104 |
| 5,136,446 A | 8/1992 | Yamamoto et al. ......... 360/106 |
| 5,148,071 A | 9/1992 | Takahashi ................... 310/208 |
| 5,168,185 A | 12/1992 | Umehara et al. ............ 310/15 |
| 5,184,265 A | 2/1993 | Foote et al. ................. 360/106 |
| 5,268,805 A | 12/1993 | Peng et al. ................. 360/106 |
| 5,291,359 A | 3/1994 | Wolter ........................ 360/104 |
| 5,508,864 A | 4/1996 | Briggs et al. ............... 360/106 |
| 5,528,091 A | 6/1996 | Loubier et al. ............... 310/13 |
| 5,530,607 A | 6/1996 | Spendlove ................... 360/105 |
| 5,621,590 A | 4/1997 | Pace et al. .................. 360/106 |
| 5,650,896 A | 7/1997 | Viskochil .................... 360/106 |
| 5,656,877 A | 8/1997 | Loubier ....................... 310/13 |
| 5,677,815 A | 10/1997 | Chan ......................... 360/106 |
| 5,691,581 A | 11/1997 | Umehara et al. ............ 310/13 |
| 5,734,528 A | 3/1998 | Jabbari et al. .............. 360/106 |
| 5,748,410 A | 5/1998 | Briggs et al. ............... 360/106 |
| 5,828,521 A | 10/1998 | Hasegawa ................... 360/104 |
| 5,835,308 A | 11/1998 | Hasegawa ................... 360/104 |
| 5,969,908 A | 10/1999 | Angellotti ................... 360/106 |
| 6,084,750 A | 7/2000 | Shimazu et al. ............ 360/106 |
| 6,306,332 B1 * | 10/2001 | Angellotti .............. 264/272.15 |

* cited by examiner

Primary Examiner—Angela Ortiz
(74) Attorney, Agent, or Firm—Woodcock Washburn LLP

(57) ABSTRACT

This invention includes a carnage assembly for carrying read/write heads into engagement with a recording medium. The carriage assembly comprises a carriage body formed from molded plastic. The body defines a sidewall having a first open end and a second open end with a passage extending therebetween. A coil is interlockingly coupled with the carriage body sidewall by being molded to carriage body. At least one carnage arm for carrying at least one head is interlockingly coupled with the carriage body sidewall by being molded to the carnage body.

14 Claims, 10 Drawing Sheets

FIG.8A
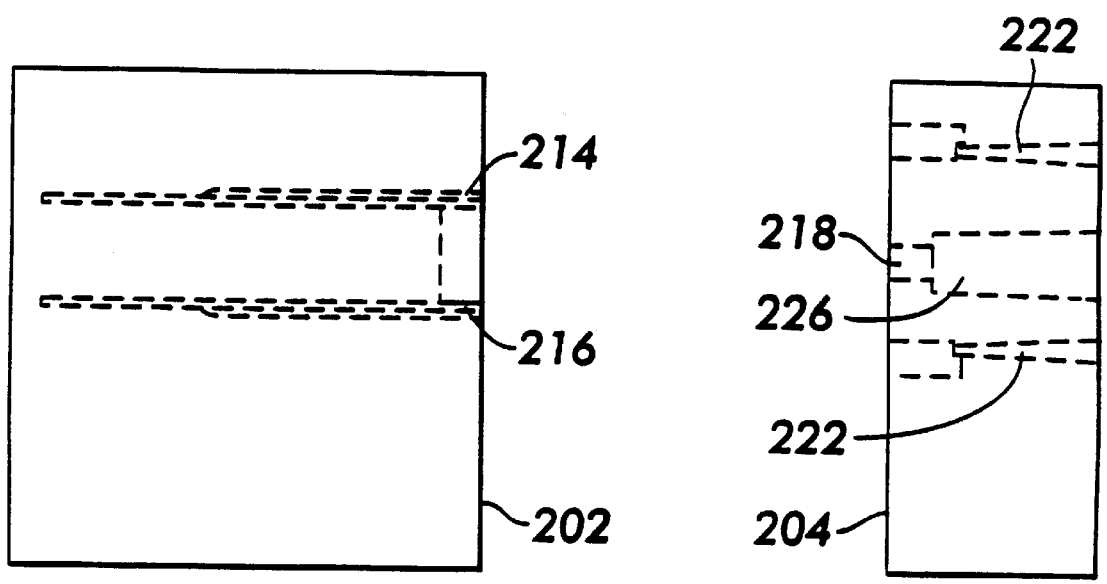
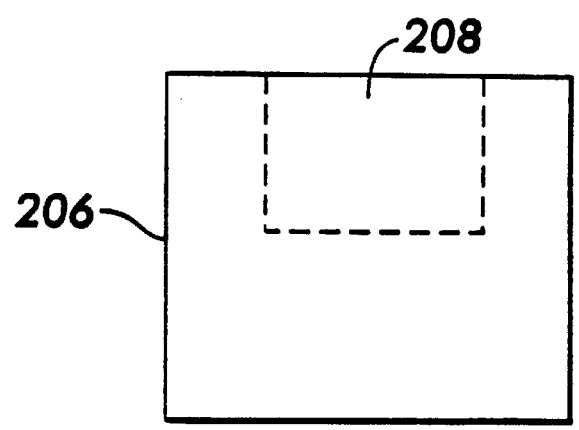

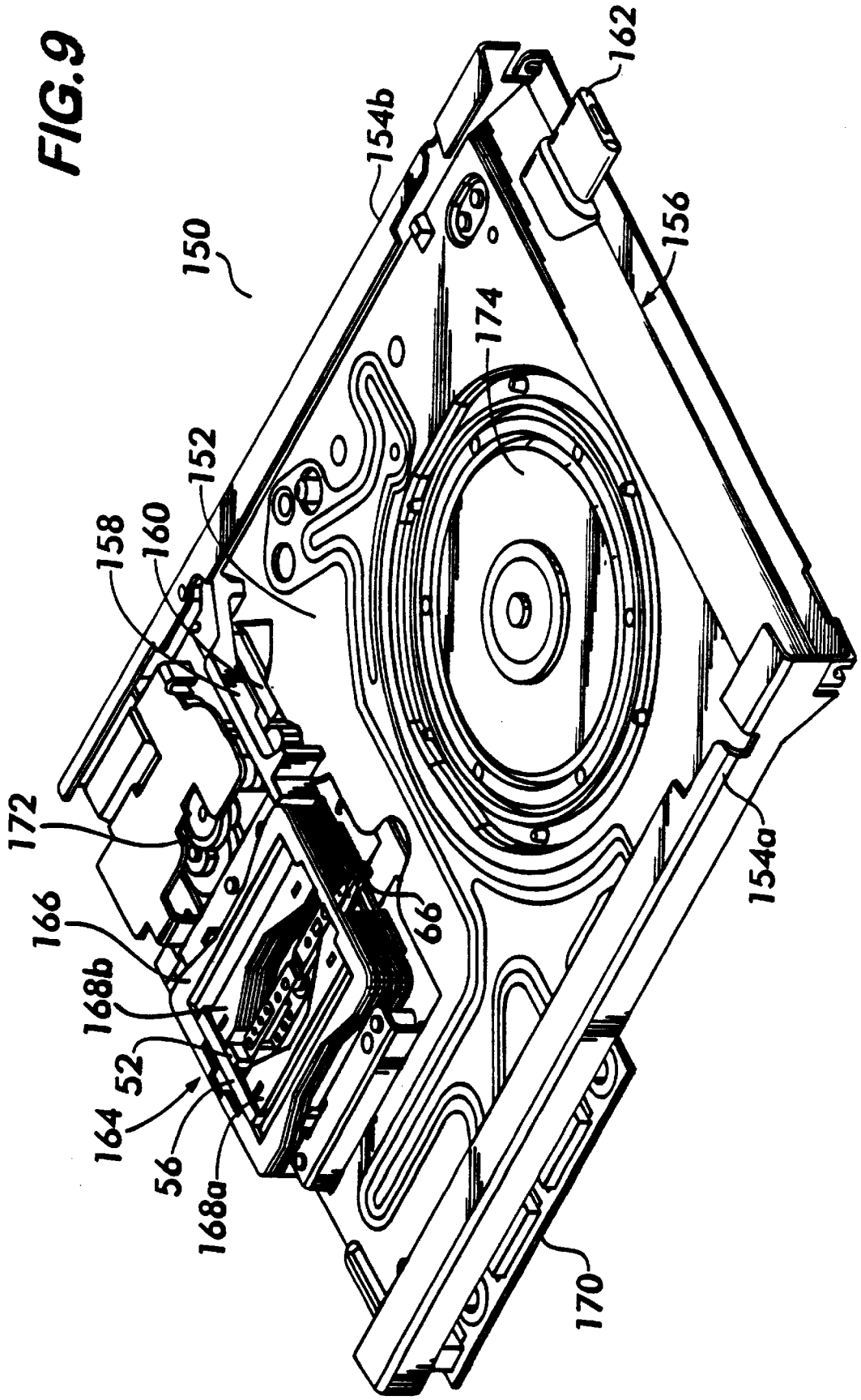

METHOD OF MAKING A CARRIAGE ASSEMBLY FOR A DISK DRIVE

RELATED APPLICATIONS

This Application: is a continuation of application Ser. No. 09/684,503; filed Oct. 6, 2000, now abandoned, which is a divisional of U.S. patent application Ser. No. 08/872,712 filed May 30, 1997 which issued as U.S. Pat. No. 6,147,842 on Nov. 14, 2000 and which applications are both hereby incorporated by reference.

The present application is related to the following patent applications all of which are hereby incorporated by reference in their entirety: Ser. No. 08/866,189, filed on May 30, 1997, entitled "An Improved Operating System For Operating An Eject System And A Head Retraction System Of A Disk Drive" (Attorney Docket No. 10M-9460); Ser. No. 08/881,804, filed on May 30, 1997, entitled "Media Capture to Prevent Head Damage In A Removable Cartridge Disk Drive" (Attorney Docket No. IOM-9463); Ser. No. 08/866,225, filed on May 30, 1997, entitled "An Improved Head Retraction System for Retracting The Heads Of A Disk Drive" (Attorney Docket No. IOM-9464); Ser. No. 08/881,803, filed on May 30, 1997, entitled "Steering Magnets To Reduce Magnetic Leakage Flux In A Disk Drive" (Attorney Docket No. IOM-9507); Ser. No. 08/881,805, filed on May 30, 1997, entitled "Laminated Steel Return Path With Actuator Support Features" (Attorney Docket No. IOM-9508); Ser. No. 08/866,190, filed on May 30, 1997, entitled "Dual Loop Flex Circuit For A Linear Actuator" (Attorney Docket No. IOM-9509); Ser. No. 08/881,806, filed on May 30, 1997, entitled "Head Gimbal Protection For A Disk Drive" (Attorney Docket No. 9512); Ser. No. 08/866,168, filed on May 30, 1997, entitled "Flexured Mounting System For Friction Reduction And Friction Linearization In Linear Actuator For Disk Drive" (Attorney Docket No. IOM-9514); Ser. No. 08/881,807, filed on May 30, 1997, entitled "Return Path Geometry to Enhance Uniformity of Force On A Linear Actuator" (Attorney Docket No. IOM-9516); Ser. No. 08/886,180, filed on May 30, 1997, entitled "In-Rigger For A Linear Actuator Carnage Assembly" (Attorney Docket No. IOM-9517); Serial No. 08/866,171, filed on May 30, 1997, entitled "Integral Lift Wing For A Disk Drive Actuator" (Attorney Docket No. IOM-9518); Ser. No. 08/866,227, filed on May 30, 1997, entitled "Head Protection In A Disk Drive" (Attorney Docket No. IOM-9519); Ser. No. 08/866,167, filed on May 30, 1997, entitled "Self-Positioning Lever For Opening The Shutter Of A Removable Disk Cartridge" (Attorney Docket No. IOM-9525); Ser. No. 08/866,177, filed on May 30, 1997, entitled "Motor Loading System For A Disk Drive" (Attorney Docket No. IOM-9526); Ser. No. 08/866,226, filed on May 30, 1997, entitled "An Improved Eject System For Ejecting a Disk Cartridge From A Disk Drive" (Attorney Docket No. IOM-9527); Ser. No. 08/881,808, filed on May 30, 1997, entitled "Cover For A Disk Drive" (Attorney Docket No. IOM-9547).

FIELD OF THE INVENTION

The present invention is related to linear actuators for carrying read/write heads into engagement with a recording medium, and, more particularly, to a carriage assembly employed for mounting read/write heads.

BACKGROUND OF THE INVENTION

Description of the Prior Art

Disk drives for storing electronic information are found in a wide variety of computer systems, including workstations, personal computers, and laptop and notebook computers. Such disk drives can be stand-alone units that are connected to a computer system by cable, or they can be internal units that occupy a slot, or bay, in the computer system. Laptop and notebook computers have relatively small bays in which to mount internal disk drives and other peripheral devices, as compared to the much larger bays available in most workstation and personal computer housings. The relatively small size of peripheral bays found in laptop and notebook computers, can place significant constraints on the designer of internal disk drives for use in such computers. Techniques that address and overcome the problems associated with these size constraints are therefore important.

Disk drives of the type that accept removable disk cartridges have become increasingly popular. FIG. 1 shows one disk drive product, known as the ZIP™ drive, that has been very successful. This disk drive is designed and manufactured by Iomega Corporation, the assignee of the present invention. ZIP™ drives accept removable disk cartridges that contain a flexible magnetic storage medium upon which information can be written and read. The disk-shaped storage medium is mounted on a hub that rotates freely within the cartridge. A spindle motor within the ZIP™ drive engages the cartridge hub when the cartridge is inserted into the drive, in order to rotate the storage medium at relatively high speeds. A shutter on the front edge of the cartridge is moved to the side during insertion into the drive, thereby exposing an opening through which the read/write heads of the drive move to access the recording surfaces of the rotating storage medium. The shutter covers the head access opening when the cartridge is outside of the drive, to prevent dust and other contaminants from entering the cartridge and settling on the recording surfaces of the storage medium.

The ZIP™ drive is presently available for workstations and personal computers in both stand-alone and internal configurations. In order to provide a version of the ZIP™ drive for use in laptop and notebook computers, the size constraints of the peripheral bays of such computers must be considered. In particular, for an internal drive to fit in the majority of laptop and notebook peripheral bays, the drive must be no longer than 135 mm. The height of the drive must be in the range of 12 to 15 mm. These dimensions place many constraints on the design of such a drive, and give rise to numerous design problems.

FIG. 1 shows a carriage assembly that is employed in the ZIP™ and disclosed in Ser. No. 08/727,128, entitled Actuator For Storage Device, filed on Oct. 8, 1996 and hereby incorporated by reference in its entirety. The ZIP™ drive carriage assembly 10 comprises a main carriage 12, carriage arms 20, load beams 24, write/read heads 26, voice coil 16, an outrigger 18 and outrigger guide track 46. The carriage arms 20 are formed with the main carriage 12. Each carriage arm 20 is mechanically coupled to a corresponding load beam 24. Each head 26 is mechanically coupled to a corresponding load beam 24.

The carriage 12 comprises an elongated sidewall 28 that defines two opposing open ends 30 and 32 with a passage 34 extending therebetween. The open ends 30 and 32 are adapted to receive cylindrical bushings 36 and 38. The passage 34, open ends 30 and 32, and bushings 36 and 38 are adapted to slidingly receive the guide track 40.

The coil 16 is mounted to the carriage 12 by adhesives or other bonding methods. The outrigger 18 is mounted to a portion of the coil 16 and travels along the outrigger guide track 46 to prevent rotation of the carriage assembly 10 when the carriage assembly is in operation. Most of the components described above are coupled to one another by individual connecting steps, such as with adhesives and bonding methods. There are several drawbacks with having to attach these components individually.

One drawback with this carriage assembly is that each component must be individual attached within close tolerances to form the carriage assembly. These tolerance, however, require nearly exact precision which is relativley difficult to obtain. t would, therefore, be desirable to provide a carriage assembly that substantially meets the required tolerance more exactly and easily.

Another drawback this type of carriage assembly is that it-is relatively large and, therefore, cannot be employed in smaller electronic environments. It would therefore be desirable to provide a carriage assembly that can be employed in smaller electronic environments.

Yet another drawback of this type of carriage assembly is that it contains a relatively large number of components that must be designed, attached, and accounted for. It would therefore be desirable to reduce the number of components that comprise a carriage assembly.

SUMMARY OF THE INVENTION

In accordance with the present invention, a carriage assembly for carrying read/write heads into engagement with a recording medium is provided. The carriage assembly comprises a carriage body. The body defines a sidewall having a first open end and a second open end with a passage extending therebetween. A coil is interlockingly coupled with the carriage body sidewall. At least one carriage arm for carrying at least one head is interlockingly coupled with the carriage body sidewall.

BRIEF DESCRIPTION OF THE DRAWINGS

FIG. 8A is a sectional sideview of the mold assembly; and

FIG. 9 is a perspective view of an exemplary disk drive in which a carriage assembly in accordance with the present invention may be employed.

DETAILED DESCRIPTION OF THE PREFERRED EMBODIMENTS

Figure 1:
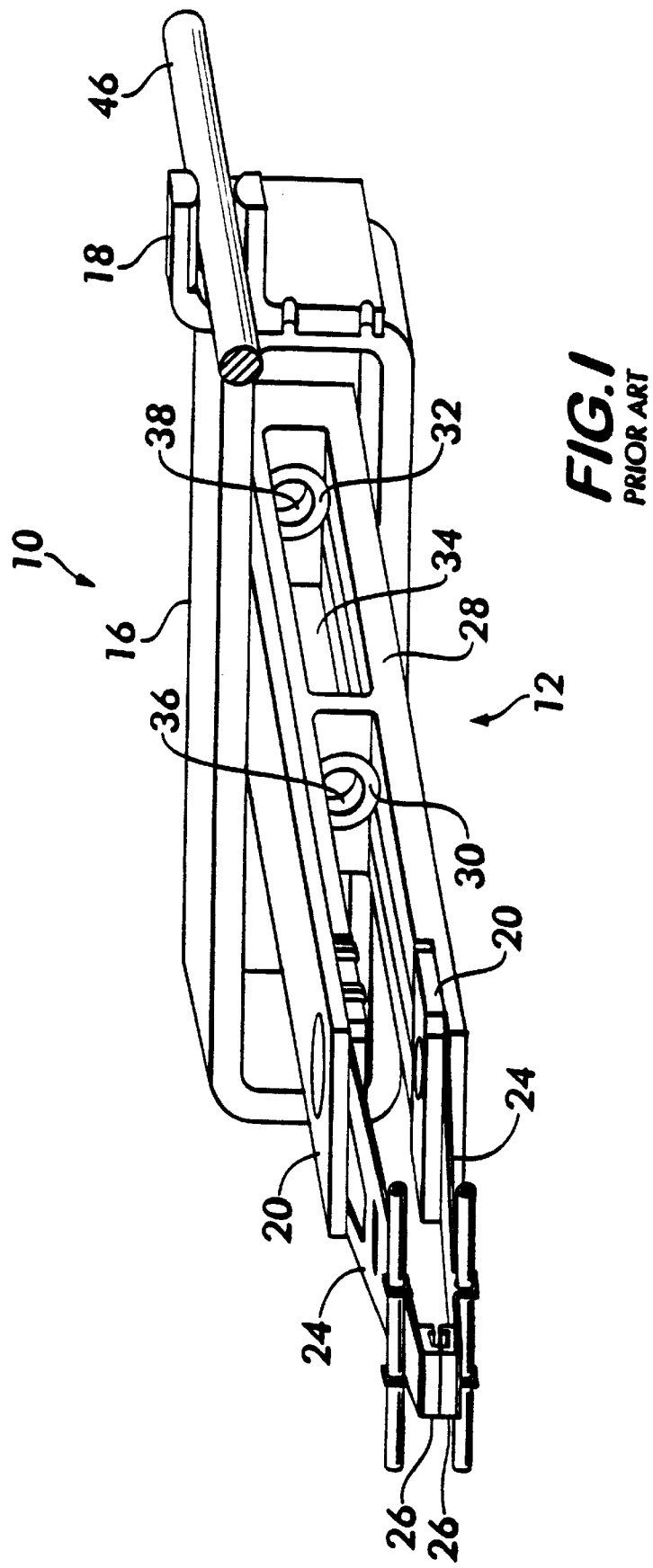
FIG. 1 is a perspective view of a prior art carriage assembly.
Figure 2:
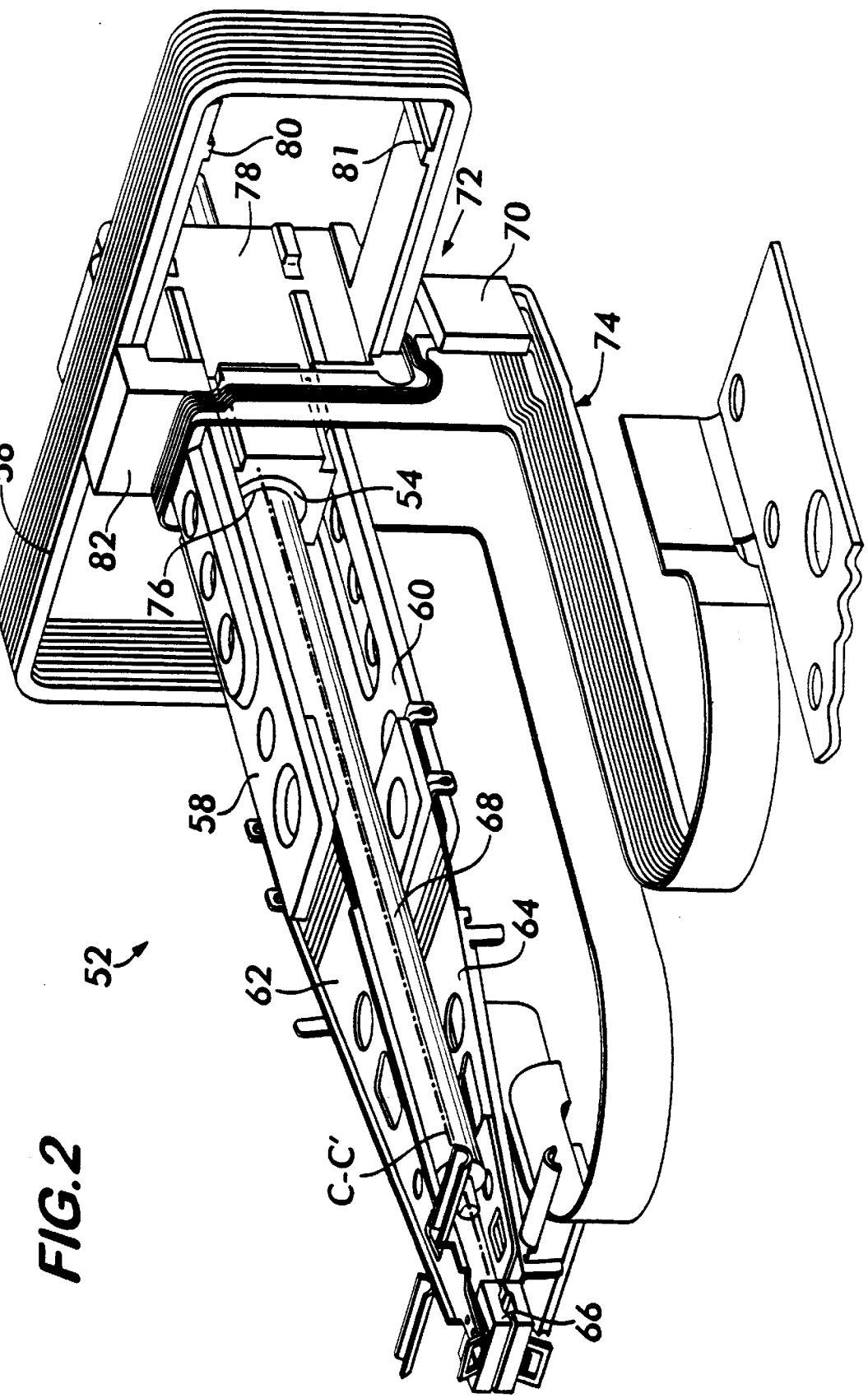
FIG. 2 is an enlarged perspective view of an linear actuator incorporating a carriage assembly in accordance with the present invention.

FIG. 2 is an enlarged view of a actuator carriage assembly 52 in accordance with the present invention.

The actuator carriage assembly comprises a front bearing 58, a voice coil 56, upper carriage arm 58, lower carriage arm 60, upper load beam 62, lower load beam 64, read/write heads 66, center rod or guide track 68 having a center axis C—C', an amplifier chip 70, traces for the voice coil 72, and flex circuits 74 which are coupled to the carriage body 78.

The guide track 68 is positioned within a passage 76 defined by the carriage body 78 such that the carriage body 78, voice coil 56, carriage arms 58 and 60, and load beams 62 and 64 are all substantially symmetrically centered around and move along the guide track 68. Additionally, the guide track 68 is adapted to ride along the front bearing 54 and rear bearing (not shown) to linearly direct the carriage assembly. Such symmetrical spacing is advantageous because it aligns the carriage assembly center of mass and center of force along the guide track. Such alignment also minimizes friction and avoids binding forces and resonance problems.

Figure 3:
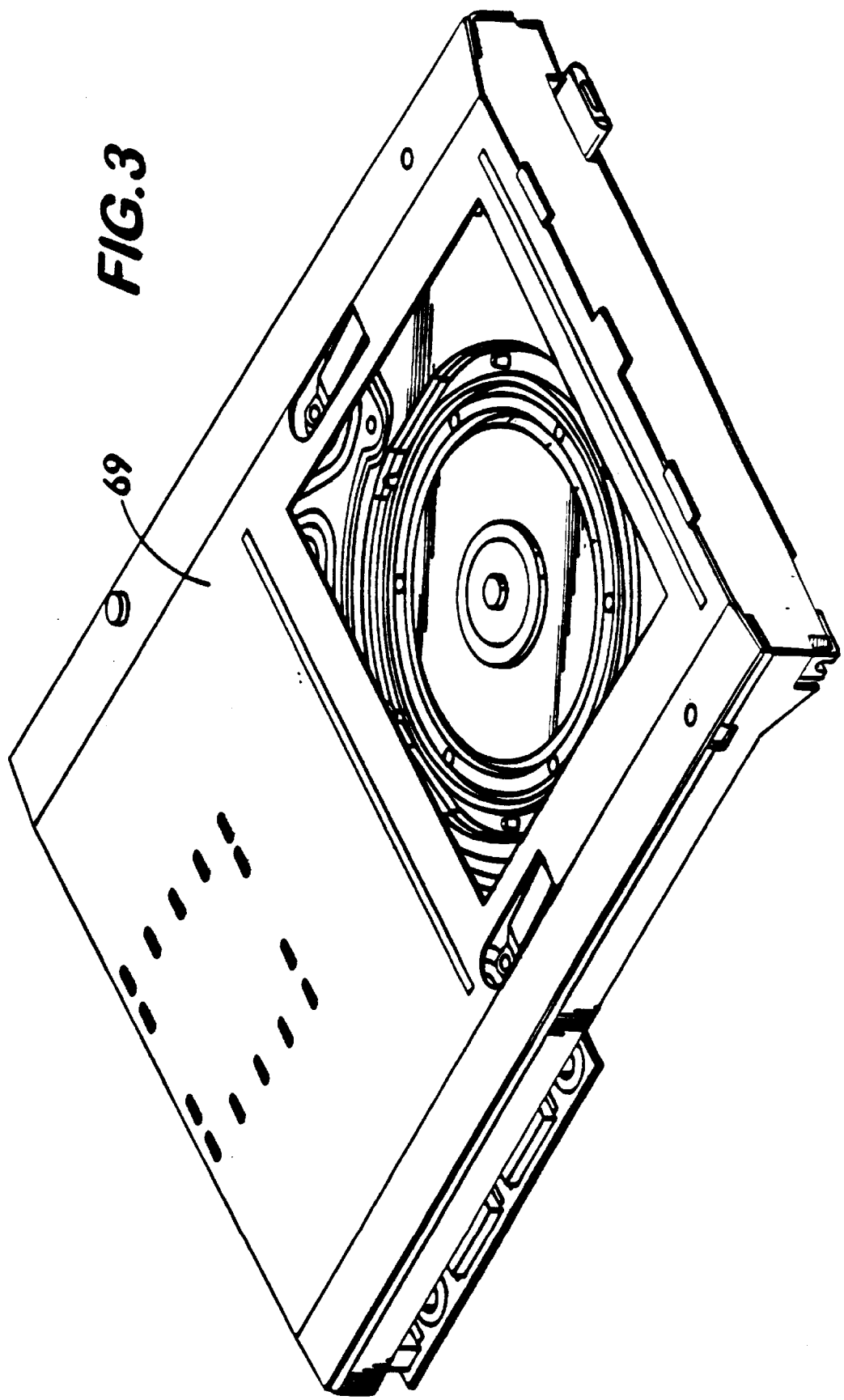
FIG. 3 is a perspective view of an exemplary disk drive incorporating the present invention.

Although the guide track 68 linearly directs the carriage assembly 52, the carriage assembly 52 remains unrestrained from rotating about the guide track 68. Such rotation causes the carriage assembly 52 to roll about the center axis, which in turn, adversely affects the accurate pitch of the read/heads 66. This roll can also cause the coil 56 and other components to make contact with the actuator cover 69 (FIG. 3) which is located directly above the voice coil 56. The in-riggers 80 are provided to maintain the desired positioning of the carriage assembly 52 when the assembly is in operation. The in-riggers 80 and cover 68 are discussed in more detail below.

The function and purpose of the traces for the coil 72, amplifier chip 70, and flex circuit 74 and how they are coupled to the carriage body 78 are discussed in more detail in the following copending patent application assigned to the assignee of the present case entitled "Dual Loop Flex Circuit For a Linear Actuator, Ser. No. 08/866,190, filed concurrently herewith and hereby incorporated by reference in its entirety.

Figure 4:
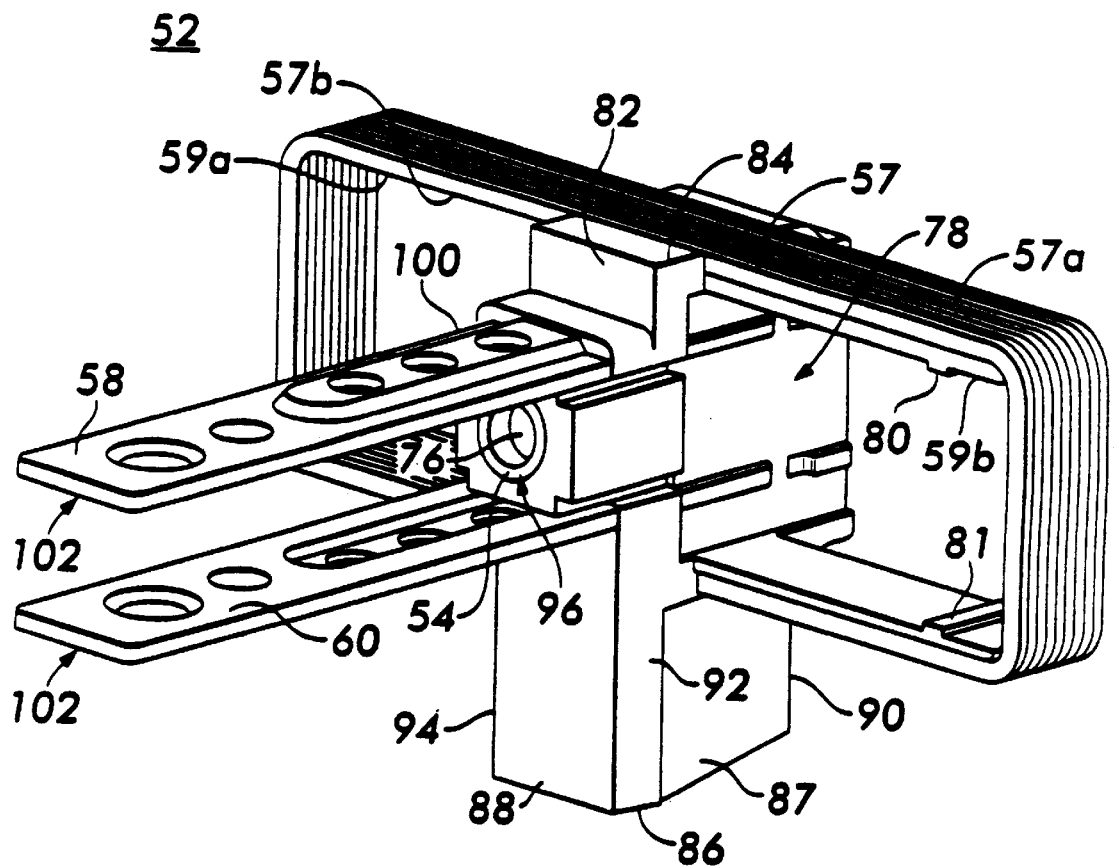
FIG. 4 is a perspective view of the carriage assembly shown in FIG. 2 without all of the operating components coupled thereto.

FIG. 4 shows the carriage assembly accordance with the present invention in more detail. Specifically, the carriage body 78 defines a sidewall 82. Preferably, the sidewall 82 has an upper surface 84, bottom surface 86 having a generally triangular portion 87 adapted to be coupled with the flex circuit, relative front surface 88, relative back surface 90, and two side surfaces 92 and 94 therebetween. The relative front surface 88 defines a first open end 96 and the relative back surface 90 defines a second open end 98. A passage 76 extends between the first open end 96 and second open end 98. Preferably, the carriage body 78 is made from VECTRA® Liquid Crystal Polymer (LCP) a plastic material sold by General Electric, located in Massachusetts.

A first or front bearing 54 is coupled with the sidewall 82 proximate the first open end 96 and the rear or a second bearing 55 is coupled with the sidewall proximate the second open end 98. Preferably the front bearing 54 is interlockingly coupled proximate the first open end with the side wall 82. Preferably, the first bearing is a sapphire jewel bearing. The preferred rear bearing 55 is described in copending patent application assigned to the assignee of the present case entitled "Elongated Rear Bearing For Linear Actuator", Ser. No. 08/866,758, filed concurrently herewith and hereby incorporated by reference in its entirety. The rear bearing is attached by a press fit, adhesive or other similar method. The guide track 68 is adapted to be slidingly mounted within the passage 76 and in sliding cooperation with each of the bearings 54 and 55. With the front bearing 54 interlockingly coupled with the sidewall, the front bearing 54 is maintained in its desired operating position without the application of adhesives or bonding methods.

The carriage assembly 52 comprises at least one carriage arm 58 for coupling a load beam 62 and at least one read/head 66. Preferably, an upper carriage arm 58 and a lower carriage arm 60 are provided. Each carriage arm has a proximal end 100 and distal 102. A portion of the proximal end 100 of each arm 30 is interlockingly coupled with the carriage body sidewall 82, front surface 88. The upper carriage arm 58 is interlockingly coupled with the sidewall 82 above the first open end 96 in spaced relationship from the lower carriage arm 60 which is interlockingly coupled within the carriage body sidewall 82 below the first open end 96. The distal end 102 of each carriage arm 58 and 60 is adapted to be mechanically coupled with a corresponding load beam 62. The upper 58 and lower 60 carriage arms 58 and 60 are positioned such that when the load beams 62 and read/write heads 60 are coupled thereto, the heads 60 engage the recording medium at the desired location. With the carriage arms 58 and 60 interlockingly coupled within the sidewall, the carriage arms are maintained in their desired operating position without the application of adhesives or bonding methods. The preferred shape and other characteristics of each carriage arm are discussed in more detail below.

The coil 56 is preferably interlockingly coupled along the upper surface 84 of the carriage body sidewall 82 between the front surface 88 and back surface 90 of the carriage body sidewall 82. Preferably, the coil 56 has a sidewall 57 having a generally rectangular cross-section with a relative outer surface 57a and relative inner surface 57b. In this position, the coil 56 provides opposite openings 59a and 59b that are adapted to be in sliding communication with the inner return paths 168a and 168b. With the coil 56 interlockingly coupled with the sidewall, the coil is maintained in its desired operating position with the application of bonding methods or adhesives. Additionally, a subcarriage is not required to couple the coil to the carriage body.

At least one in-rigger 80 in accordance with the present invention is coupled with the carriage body sidewall 82 such that the carriage assembly 52 is maintained in operating position as the carriage assembly is manipulated to engage a recording medium. Preferably, two opposing in-riggers 80, 81 are integrally formed with the carriage body sidewall 82 and interlockingly coupled with portions of the coil inner surface 57b. Preferably, the in-riggers are made of the same material as the carriage body. With the in-riggers 80, 81 provided in this manner, the need for an out-rigger and out-rigger guide rail is eliminated and, thereby, conserves space in the carriage assembly and reduces the number of components that must be accounted for in the carriage assembly. The in-riggers are discussed in more detail below.

Figure 7:
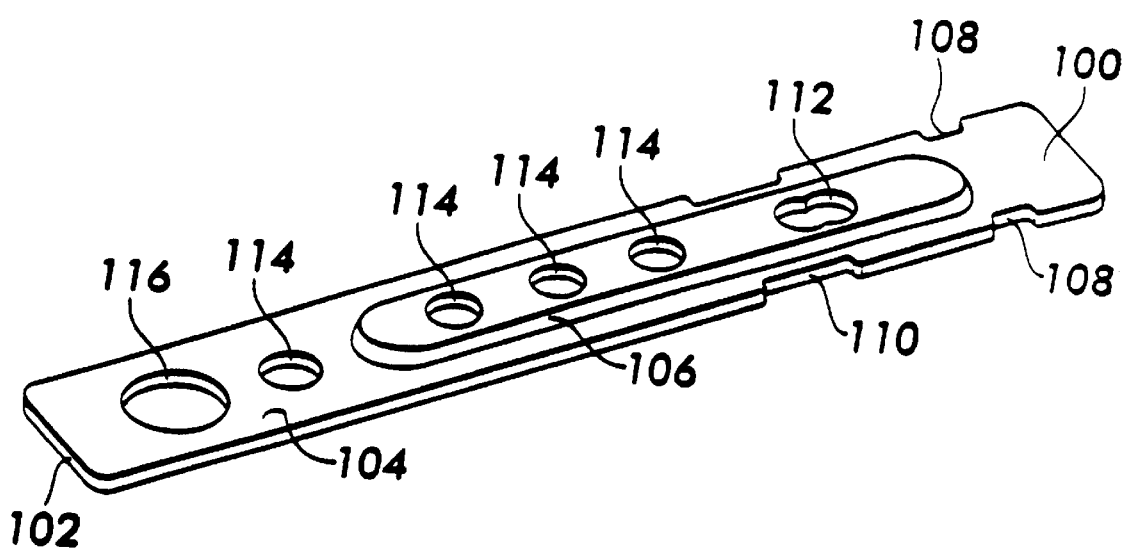
FIG. 7 is a perspective view of a carriage arm employed in the carriage assembly shown in FIG. 3.

The coil 56 is adapted to be in sliding cooperation with the two inner return paths 36a, 36b on opposite sides of the carriage assembly 32 (see FIG. 7). Preferably, the in-riggers 80, 81 are adapted to be in sliding communication with only one of the inner return paths.

Figure 5:
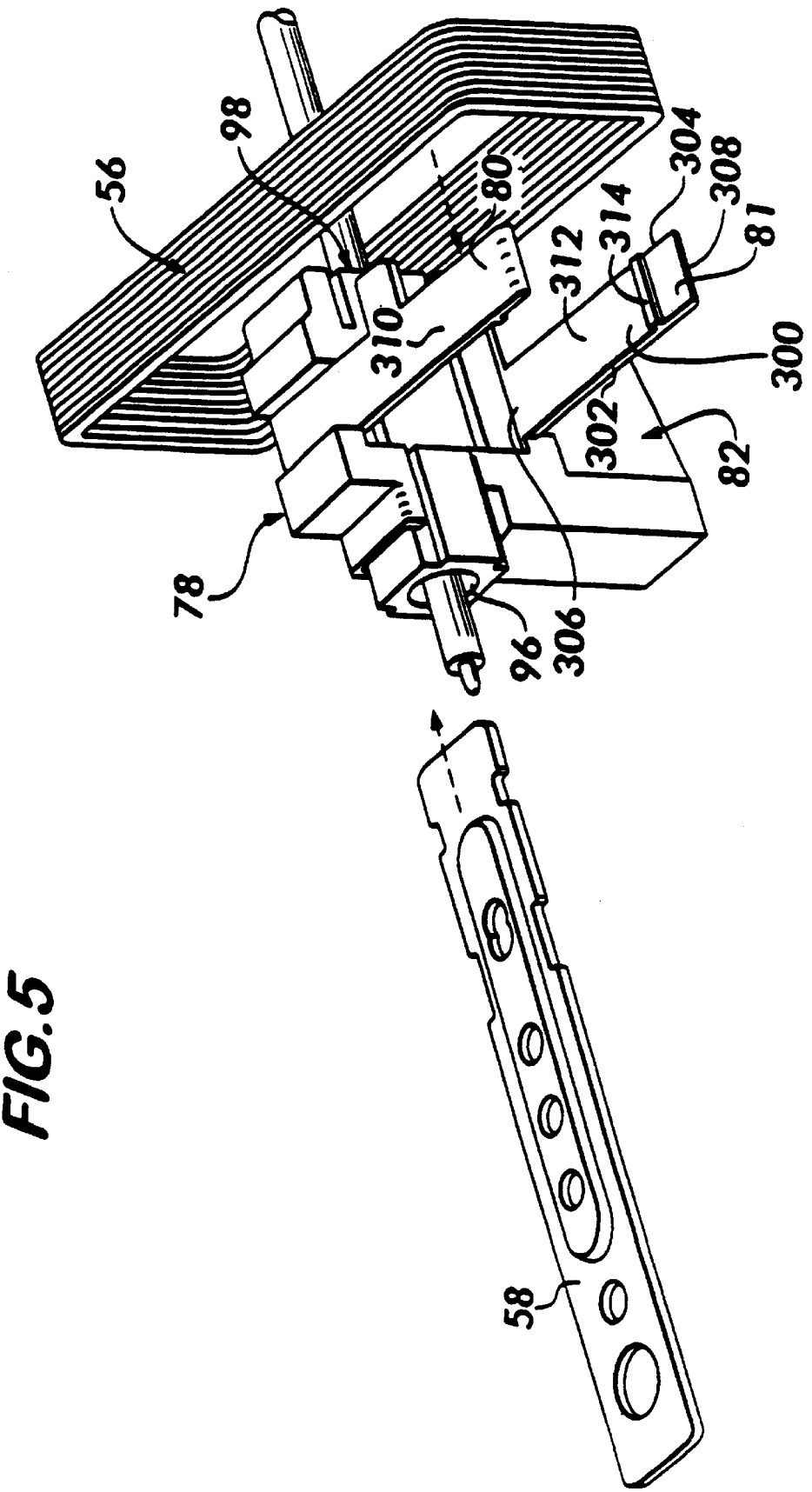
FIG. 5 is an exploded view of a carriage assembly according to one aspect of the present invention.

FIG. 5 is an exploded view of the carriage assembly, coil, in-rigger, and upper carriage arm. The lower carriage arm and guide track are removed from this figure for clarity sake. An upper in-rigger 80 and lower in-rigger 81 opposing one another are coupled to the carriage body sidewall 82. Preferably, each in-rigger 80, 81 is integrally formed with the carriage body sidewall 82.

Preferably, each in-rigger comprises an elongated member 300 extending laterally from carriage body 78. The elongated member 300 has a relative front portion 302, relative rear portion 304, first end 306 proximate the carriage body, an opposing second end 308. The elongated member also has a relative outer surface 310 and relative inner surface 312. The length and width of each in-rigger will depend upon the size of the coil and of the electrical component that is employed.

A protruding portion 314 extends away from the inner surface 312 proximate the second end 308 and traverses from the relative front portion 302 to the relative rear portion 304 of the elongated member 300.

Figure 6:
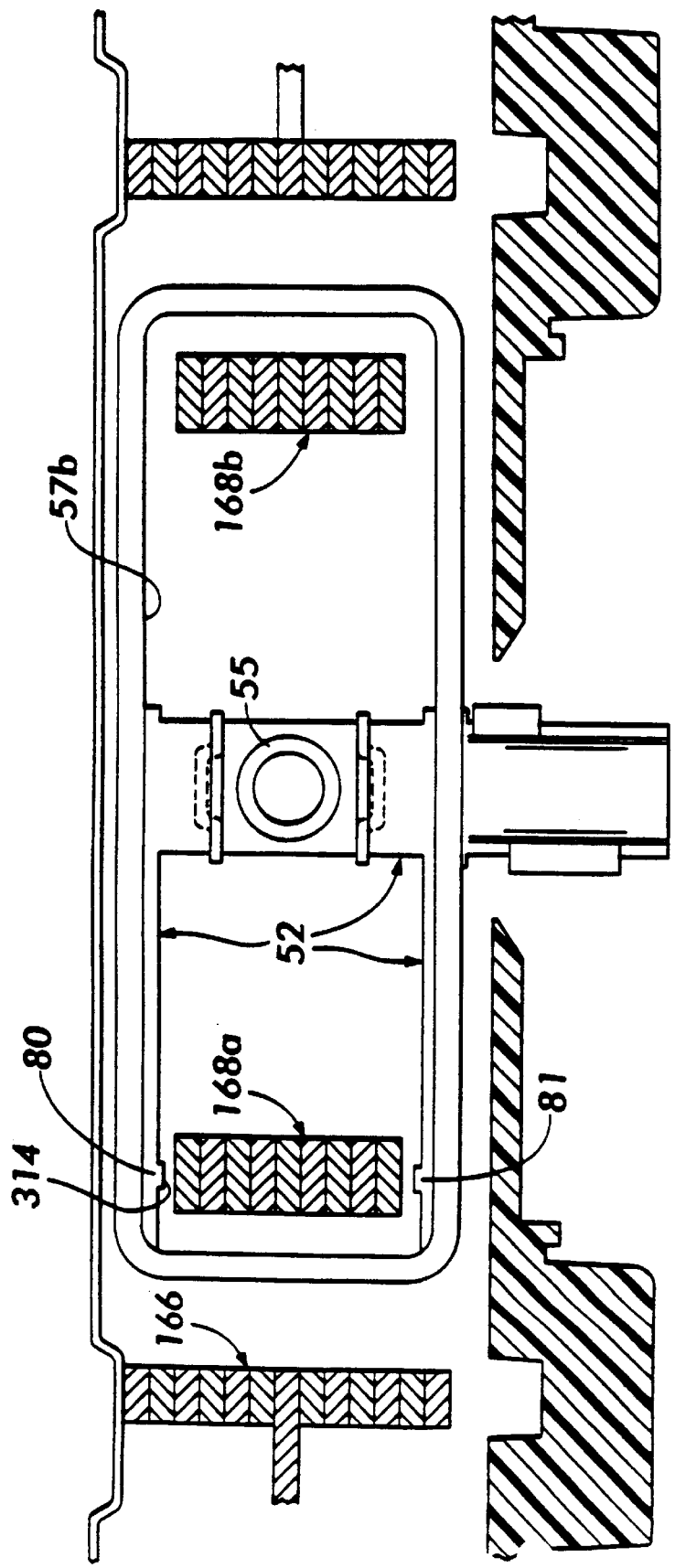
FIG. 6 is a rear view of a carriage assembly in accordance with one aspect of the present invention.

Referring to FIG. 6, the protruding portion 314 is adapted to pressingly or pushingly cooperate with one of the inner return paths 168a when the carriage assembly is in operation to maintain the desired position of the carriage assembly. The outer return paths 166 and rear bearing 55 are also shown.

The relative outer surface 310 of each elongated member 300 is adapted to abuttingly cooperate with the inner surface 57b of the coil 56 when the coil is interlockingly coupled with the carriage body sidewall. Preferably, the outer surface 310 of each elongated member is substantially flat.

It is noted that the in-rigger 80 can be produced separately from the carriage body and be employed with other carriage assemblies in addition to the specific carriage assembly embodiment discussed herein. Each in-rigger can be attached to the coil with an adhesive or like attaching methods. In this alternative embodiment, the dimensions of the in-rigger will depend upon the actual coil and actuator assembly employed.

Preferably, the in-riggers 80 are adapted to be in sliding communication with only one of the inner return paths. The positioning of the in-riggers 80 in relationship to the inner return paths 168a prevents the coil from rotating and hitting the cover.

FIG. 7 shows the carriage arm 58 in more detail. The carriage arm 58 comprises an elongate body 104 having a proximal end 100 and distal end 102. The body 104 defines a stiffening bead 106 for strengthening the carriage arm. Preferably, the bead 106 is a continuous oblong shaped bead. The bead 106 extends between the distal end and proximal end. The proximal end 100 of the body defines one set of opposing relatively small slots 108 and one set of relatively large slots 110. The portion of the body extending between these slots is adapted to be securely interlocked with the front surface 88 of the carriage body sidewall 82. Several holes are formed in the body for different purposes.

A through hole 112 is formed in the elongated body proximate the proximal end 100 of the body. Preferably, the through hole 112 has an oblong, oval or like shape. The purpose of the through hole is discussed below. Four apertures 114 are formed in the body 104 to reduce the weight of the carriage arm. It is desired reduce the weight to enable the carriage assembly to accelerate faster for operating purposes. An attaching opening 116 is; provided proximate the distal end 102 of the carriage arm. The attaching opening adapted to mechanically couple with a load beam.

Figure 8:
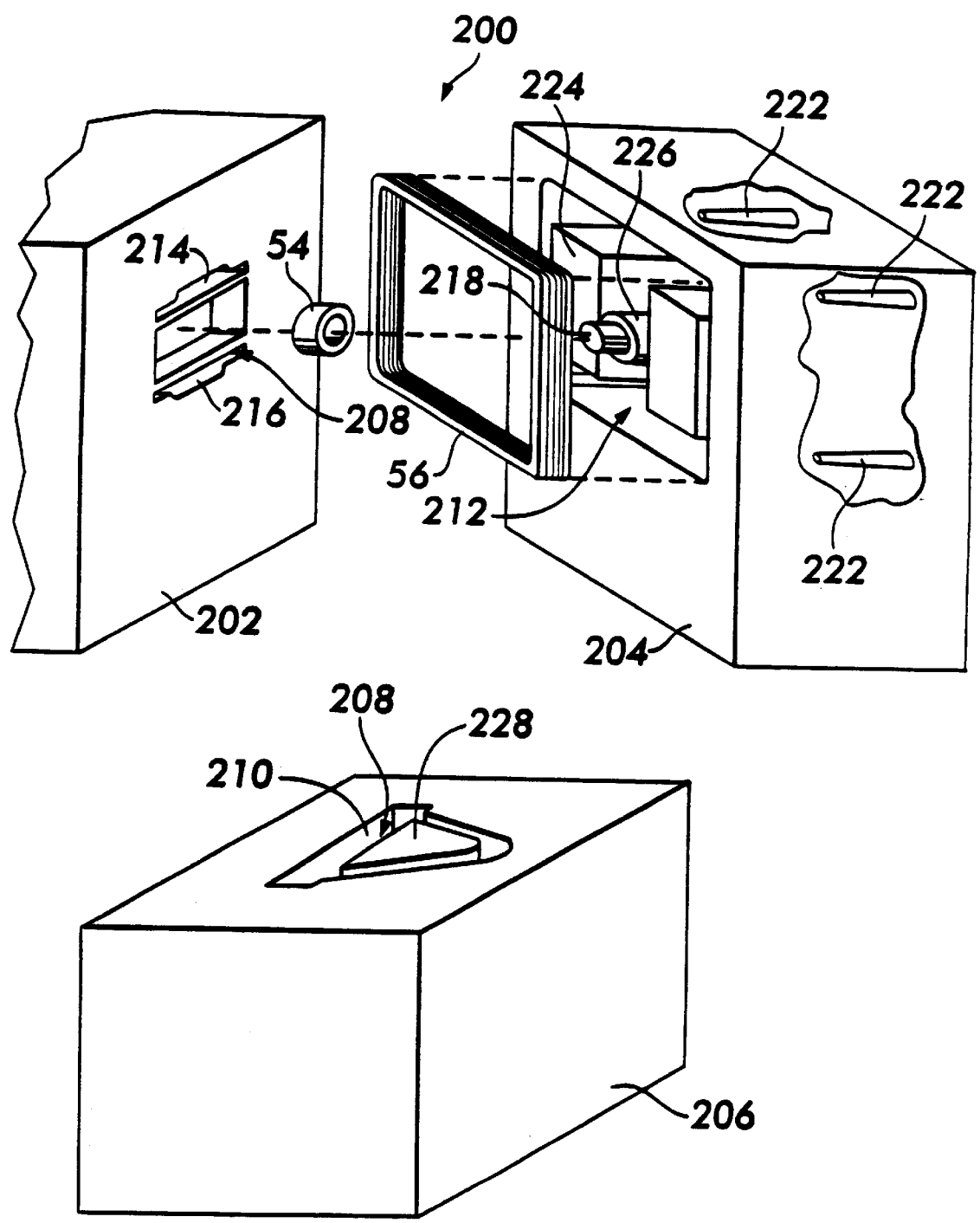
FIG. 8 is an exploded view of a mold assembly employed to produce at least one embodiment in accordance with one aspect of the present invention.

The preferred method of making the interlocking carriage assembly will now be discussed in conjunction with FIGS. 8 and 8A. Preferably the interlocking carriage assembly is produced in a mold assembly 200. The mold assembly 200 comprises a cavity member 202, core member 204 and slide member 206 which are adapted to form a whole mold chamber 208 having an inner flow surface 210. An injection assembly 212 is coupled with the core member 204 and spaced from the inner flow surface 210.

Generally, the carriage arms 58, front bearing 54, and coil 56 are placed within respective mold members and sealed therein. A material, preferably, LCP plastic material is injected through the injection assembly (not shown), and in turn, travels along the inner flow surface 210 to form the desired carriage assembly body 78 and interlockingly couple the carriage arms, front bearing, and coil to the carriage body as the material cools and hardens.

Specifically, the cavity member 202 comprises a part of the whole mold chamber having an upper carriage arm slot 214, and lower carriage arm slot 216. The upper and lower carriage arm slots are adapted to receive corresponding carriage arms in the relative position that the arms would be in the final carriage assembly. The carriage arm slots are formed and positioned within the cavity member such that the carriage arm proximal ends 100 interlocking couple with the carriage body sidewall within the desired tolerances. The carriage arm slots are spaced from a portion of the inner flow path that the plastic material flows to form a part of the carriage assembly.

The core member 204 defines another portion of the whole mold chamber and flow path. The core member 204 is designed to be coupled to an injection nozzle (not shown) at the gate 220. Ejection pins 222 are coupled to the core member to eject the finished carriage assembly from the mold. The core member 204 defines coil retaining members 224, a passage pin 226 and bearing stud 218. The coil retaining member 224, passage pin, and bearing stud are spaced from a portion of the inner flow path such that the material can flow to form the carriage assembly.

The coil retaining members 224 are formed and positioned within the core member 204 such that the coil 56 is interlockingly coupled with the body sidewall within the desired tolerances. The coil retaining members 224 are also adapted to form the cavities for forming the in-riggers when the coil 56 is positioned with the coil retaining members.

The passage pin 226 is formed and positioned within the core member and adapted from the passage that the guide track slidingly mounts in. The bearing stud 218 is adapted to receive the front bearing 54. The bearing stud 218 is formed and positioned such that the front bearing 54 is interlockingly coupled proximate the front open end. Additionally, the passage pin 226 cooperates with the front bearing stud 218 to form the carriage assembly passage such that the front bearing is interlocking coupled proximate the front open end when the plastic material is injected into the mold chamber.

The slide block member 206 defines a portion of the whole cavity for forming the relatively triangular portion 228 of the carriage body bottom surface 86 to which a flex circuit 74 is coupled to. The slide block defines a portion of the inner flow path that the injected material fills to form the relatively triangular portion on the carriage body.

Referring to FIG. 8A, the interlocking carriage assembly 52 is formed by positioning each component in each respective location. The upper carriage arm 58 and lower carriage arm 60 are positioned within each carriage arm slot. The front bearing is positioned on the bearing stud. The voice coil 56 is positioned in cooperation with the coil retaining members. The cavity member 202, core member 204, and slide block 206 are sealed together to form the whole mold. A material, preferably a plastic material such as LCP, is injected through the gate which, in turn, flows along the inner flow path interlocking couple each respective component with the carriage body as the material hardens and cools.

The carriage arm through holes are in fluid communication with the inner flow path such that the material flows to the relative location of the front open end to form the first open end.

One advantage of employing the mold assembly is that it ensures that each component is interlockingly coupled with the carriage body substantially within the desired tolerances. Another advantage is that the mold eliminates the need to individually attach each of these components to the carriage body.

Yet another advantage is that it eliminates the need for a sub-carriage to attach the voice coil to the carriage assembly.

The operation of the carriage assembly 52 will now be discussed in conjunction with FIG. 9. FIG. 9 illustrates an exemplary disk drive 150 with the cover removed, in which the carriage assembly 52 may be employed. The disk drive 150 comprises a chassis 152 having u-shaped outer edges that form opposed guide rails 154*a*, 154*b* that guide a removable disk cartridge (not shown) into the disk drive through opening 156. In the present embodiment, the chassis is metallic. A thin metal top cover (not shown) of the disk drive 150 has been removed so that the internal components of the drive are visible.

A cartridge shutter lever 158 and an eject lever 160 are rotatably mounted on the chassis. Both levers 158 and 160 are shown in the positions that they occupy when a disk cartridge is fully inserted into the drive. During cartridge insertion, the shutter lever swings from a forward position to the position. During this movement, an abutment surface on the shutter lever 158 engages a shutter of the disk cartridge and moves the shutter to the side, exposing a head access opening in the front peripheral edge of the cartridge. The eject lever also moves from a forward position to the position shown when the cartridge is inserted. In this position, the eject lever is in a cocked position, under spring tension. When it is desired to eject the disk cartridge from the drive 150, an eject button 162 is pushed. Among other things, this causes the eject lever 160 to be released from its cocked position, so that it springs forward to force the disk cartridge backwardly out of the disk drive.

The disk drive 150 also has a linear actuator 164 disposed at the rear of the chassis 152. The linear actuator 164 comprises a magnetic motor in electrical communication with the coil 56 mounted on the carriage assembly 52 in accordance with the present invention. The outer magnet return path assembly 166, and two inner return paths 168*a*, 168*b* on opposite sides of the carriage assembly 52 are in sliding communication with the coil 56 and in-rigger 80. After a disk cartridge is inserted into the disk drive 150, the carriage assembly 52 carries a pair of read/write heads 66 over the recording surfaces of a disk-shaped storage medium within the cartridge.

A spindle motor 174 is provided on the floor of the chassis 152. During cartridge insertion, the spindle motor 174 is translated vertically into engagement with a hub of the disk cartridge, in order to rotate the disk-shaped storage medium at a relatively high speed. A circuit board 170 is attached to the chassis 152 via a plurality of standoffs (not shown). The circuit board 176 carries the drive circuitry. A gear train mechanism 172 controls movement of the eject lever 160 and movement of a head retract mechanism (not shown) that moves the carriage assembly 52 to a parked position to prevent damage to the read/write heads 66, when the disk drive is not in use. The in-riggers 80 maintain the carriage assembly 52 in the desired operating position as the carriage assembly 52 moves from the parked position to the operating position and vice versa by pressing or pushing on the inner return path 168*a*, thereby preventing the coil 56 from hitting the cover.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of making a carriage assembly for a disk drive comprising:

positioning a coil around at least one coil retaining member of a mold;

positioning a bearing on a pin within the mold;

positioning a first carriage arm within a first slot within the mold;

injecting a material into a mold cavity within the mold such that the material flows underneath the coil, around the first carriage arm and the first bearing and into the mold cavity to form an in rigger; and hardening the injected material form a carriage that includes the in rigger and wherein the carriage is molded to the coil, the first carriage arm and the first bearing to form the carriage assembly.

2. The method of claim 1, wherein the injected material comprises a plastic material.

3. The method of claim 1, further comprising inserting a second carriage arm into a second slot within the mold and injecting the material around the second carriage arm.

4. The method of claim 1, further comprising separating the mold.

5. The method of claim 1, wherein hardening comprises cooling the mold.

6. The method of claim 1, further comprising injecting the molded material around the pin to form a passageway in the carriage for receiving a central guide track upon which the carriage can ride when assembled in the disk drive.

7. The method of claim 1, further comprising assembling a plurality of mold members together to form the mold prior to injecting the material.

8. The method of claim 7, further comprising ejecting the mold members apart after hardening.

9. A method of making a carriage assembly for a linear actuator of a disk drive comprising:

positioning a coil around at least one coil retaining member of a mold;

positioning a bearing on a pin within the mold;

positioning a first carriage arm within a first slot within the mold;

injecting a plastic material into a mold cavity within the mold such that the material flows underneath the coil, around the first carriage arm and the first bearing, into the mold cavity to form an in rigger and around the pin to form a passageway; and hardening the injected plastic material to from a carriage that includes the in rigger and that has the passageway, that can receive a central guide track upon which the carriage can ride when inserted into the disk drive, and wherein the carriage is molded to the coil, the first carriage arm and the first bearing to form the carriage assembly.

10. The method of claim 9, further comprising inserting a second carriage arm into a second slot within the mold and injecting the material around the second carriage arm.

11. The method of claim 9, further comprising separating the mold.

12. The method of claim 9, wherein hardening comprises cooling the mold.

13. The method of claim 9, further comprising assembling a plurality of mold members together to form the mold prior to injecting the material.

14. The method of claim 13, further comprising ejecting the mold members apart after hardening.

* * * * *